TELEPHONE LISTENING AID

Filed Aug. 20, 1951

INVENTOR.
JOHN F. ANDERSON

Patented Apr. 20, 1954 2,676,213

UNITED STATES PATENT OFFICE 2,676,213

TELEPHONE LISTENING AID

John F. Anderson, Seattle, Wash.

Application August 20, 1951, Serial No. 242,743

3 Claims. (Cl. 179—156)

This invention relates to improvements in telephone listening aids; the present application being a continuation in part of my copending application filed on September 20, 1949, under Serial No. 116,693 and entitled "Telephone Listening Aids." More particularly, this invention relates to a telephone handset supporting means comprising a head-band that is applicable to the head of the telephone receiver user, and clamping means on the head-band for clamping the ends of the said head-band in a manner to fit different heads, and for the support of the handset of a telephone, which includes a receiver and a transmitter at its opposite ends, in the most advantageous position for hearing therefrom and speaking thereinto without requiring the use of either hand to hold the handset.

Another object of this invention is to provide a handset holding means including a head-band, made from a single strip of material, with ends overlapped and secured in the desired position of adjustment by a novel form of clamp, which clamp serves the dual purposes of gripping the overlapped ends of the band as a means of securing any adjustment of the head-band, and as a support from which the telephone handset can be suspended in different positions.

It is a further object of the invention to provide a telephone receiver holding means, including the head-band and band securing clamp, and a novel form of supporting collar that is applicable about the ear piece of the handset, and which can be attached to the head-band clamp at different positions for the holding of the telephone receiver in a position that best suits the individual user.

Yet another object of the invention resides in the provision of a novel form of adjustable suspension for the mouthpiece end of the handset to be used in conjunction with the support that is applied to the ear-piece support for the suspending of the handset from the head-band in the desired position both for hearing and speaking.

Still further objects and advantages of the invention reside in the details of construction of the various parts; in their combination and in their mode of use as will hereinafter be fully described.

In accomplishing these and other objects of the invention, I have provided the improved details of construction, the preferred forms of which are illustrated in the accompanying drawings, wherein—

Figures 1, 2, 3, 4, 5:
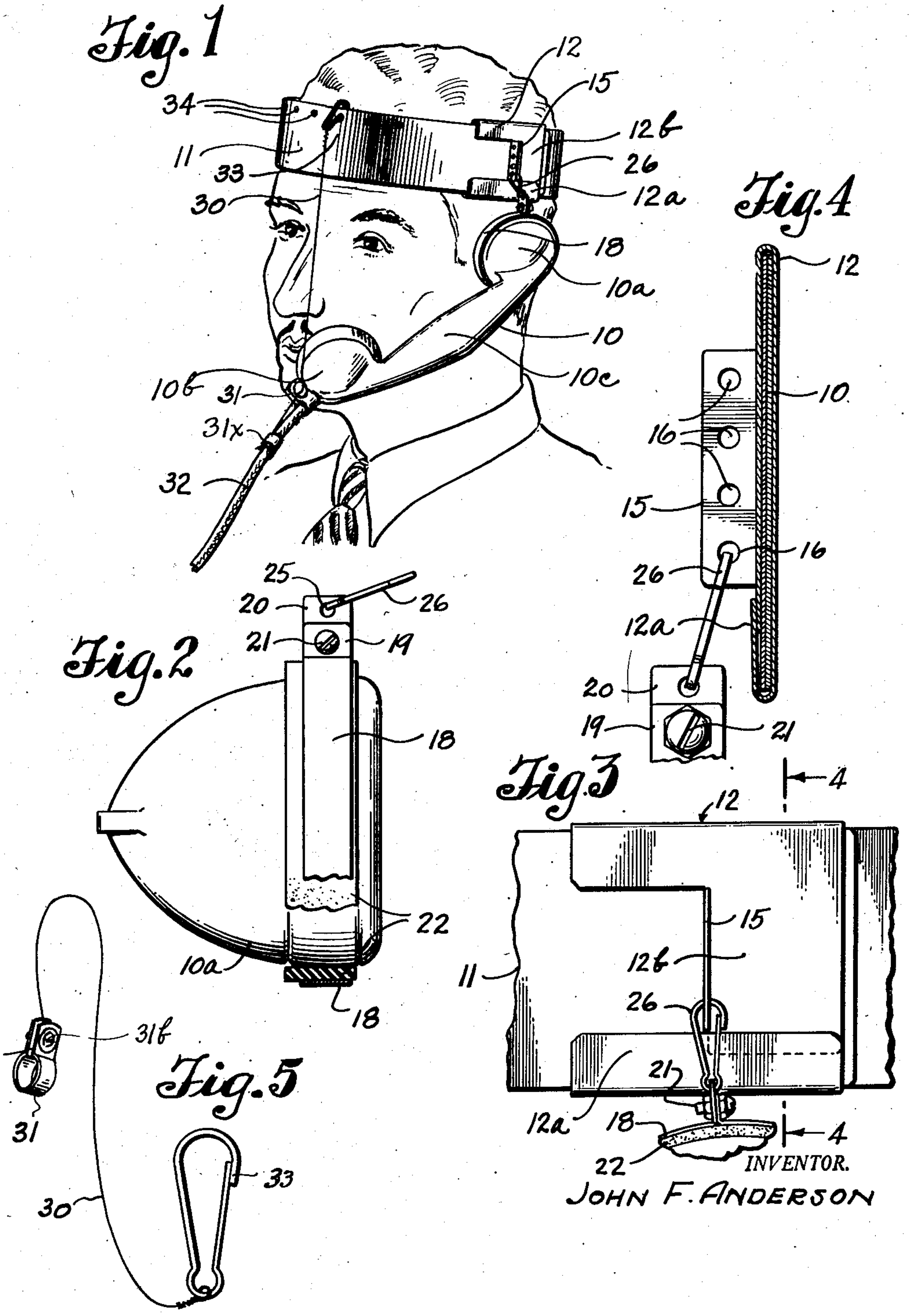
Fig. 1 is a perspective view, illustrating the use of a supporting means for a telephone handset embodied by the present invention.
Fig. 2 is an end view of the telephone handset with collar clamp as applied thereto; parts being broken away for better showing of construction.
Fig. 3 is a side view, showing overlapping ends of the head-band and the clamp applied thereto for securing adjustment of the head-band and for the support of the telephone handset.
Fig. 4 is an enlarged, cross-sectional view, taken on line 4—4 in Fig. 3.
Fig. 5 is a perspective view of the forward suspending member for support of the mouth piece end of the telephone handset.

Referring more in detail to the drawings—

In Fig. 1, I have shown the present holding means as applied to the usual type of telephone handset, which is designated in its entirety by reference numeral 10 and which comprises the ear piece 10*a*, the mouthpiece 10*b*, and the handle portion 10*c*. The holding means comprises a head-band 11 formed from a single, flat strip of suitable material, of a flexible character, and formed into a band with its ends in overlapped relationship. To secure the ends of the band together, I employ a clamp which in Fig. 1 is designated in its entirety by numeral 12. This clamp comprises a single strip of sheet metal, that is bent to provide an enclosing collar for the overlapped end portion of the band. The metal strip has a comparatively short end portion, 12*a*, herein referred to as the lower end portion, bent upwardly, and its other end portion 12*b*, which is comparatively long, bent downwardly and underlapped with the upturned end portion. The clamp as thus formed, is applied about the overlapped end portions of the head-band, in the manner shown best in Fig. 4, and it operates to frictionally grip the band ends in such manner as to retain the head band at any size to which it is adjusted for use. The circumferential size of the band may, however, be changed by pulling the ends thereof through the clamp into which the ends of the band have been inserted.

Set off from one side edge portion of the downturned part 12*b* of the clamp 12, is an out-turned and vertically directed flange 15 that is formed with a plurality of vertically spaced holes 16. This flange serves as a means for the suspension therefrom of the ear piece end portion of the telephone handset as will now be described.

For the support of the telephone, from clamp

12 I have provided a clamping collar, 18, designed for application about the circular ear piece 10*a* of the telephone handset, as shown in Fig. 2. The clamping collar comprises a thin, flexible strip of metal bent to encircle the ear piece, and formed at its ends with out-turned ears 19 and 20 through which a clamping bolt 21 is applied to draw the collar band ends toward each other to secure the collar band tightly about the earpiece. A rubber bushing 22 is applied between the earpiece of the handset and collar band and this rubber bushing serves as a cushion and also as a friction element that prevents slippage of the metal collar band relative to that part of the telephone handset about which it is applied.

It is shown in Figs. 2 and 4, that the ear 20 of collar 18 extends above the ear 19 and is formed with a hole 25 in which the inner end of a hook 26 is applied. The outer end of the hook is selectively applicable to any one of the holes 16 in flange 15 of the collar clamp as a means to suspend the telephone handset from the headband.

To support the mouthpiece end of the telephone handset, I have provided a suspending nylon line 30. This line is secured at one end to a metal band 31 that is affixed about the telephone handset cord 32 at a point near the point of its entrance to the receiver mouthpiece. At its other end it is equipped with a hook 33 that is selectively applicable to the holes 34 in the forward portion of the head-band; these being spaced at about half-inch intervals.

In use of the device, the head-band is first adjusted to fit the user by applying its opposite end portions in the clamp 12 to more or less overlapped relationship. The rubber cushion 22 and collar 18 are applied to the ear piece and set at proper position and the collar secured by tightening the clamp bolt 21. The hook 26 is then applied to a hole 34 in the front top portion of the head-band that will cause the mouthpiece to be adjusted sideways to best suit the user. The nylon line 30 is applied to clamp 31, adjusted to the desires of the user and secured by tightening the closing nut and bolt 31*b* of clamp 31. Its free end that may extend from the clamp, is then applied to a clip 31*x* that is fitted to and slidably adjustable along the cord.

If it should be desired to suspend the telephone handset from the opposite side of the head, it is only necessary to withdraw the ends of band 11 from the clamp 12, then bend the band in the reverse position and apply the ends to the clamp 12 in the same manner as before. Then the hook 33 can be applied to a selected hole 34 in the head-band.

With the device so constructed and applied, the telephone handset can be held at any set position, and so suspended is easily held; is easy to place in position, and does not require use of the hands to hold it for hearing or conversing.

The various sideways and up and down adjustments add to the adaptability of the device to different persons.

Having thus described my invention, what I claim as new therein and desire to secure by Letters Patent is:

1. A support for a handset of a telephone which includes a receiver portion and a transmitter portion at its opposite ends; said support comprising a head band, formed from a single flat strip of flexible material, with the opposite end portions thereof slidingly overlapped, a yieldable clamp member applied about the overlapped end portions of the head band to retain the adjustment in head size, and permitting change in adjustment by manually effecting longitudinal slippage of the said overlapped end portions; said clamp member including an outwardly extended flange of substantial vertical length formed with a succession of vertically spaced holes, a hook pivoted on the receiver portion of the handset and selectively applicable to the holes of the said flange thus to adjustably suspend the handset with the receiver portion in position of use relative to the ear of the user and a flexible suspending means attached to and supporting the transmitter portion of the handset from the forward portion of the head band.

2. A support for a handset of a telephone as recited in claim 1 wherein the said head band is formed across the front portion thereof with a succession of horizontally spaced holes and said flexible suspending means is equipped at it upper end with a hook that is selectively applicable to said holes of the head band to cooperate with the hook as applied to the receiver end of the handset to adjustably support the transmitter end thereof in position.

3. A support for the handset of a telephone as recited in claim 1 wherein a rubber bushing encircles the receiver end portion of the handset, a clamping collar is applied about the bushing, said band having out-turned ears at its ends and a clamp screw applied through said ears for tightening the band to secure it at a definite position relative to the handle, one of said ears being extended beyond the other and provided with a hole within which the lower end of the first mentioned hook is pivoted.

References Cited in the file of this patent

UNITED STATES PATENTS

| Number | Name | Date |
|---|---|---|
| 1,085,916 | Hutchison | Feb. 3, 1914 |
| 1,951,332 | Barclay | Mar. 20, 1934 |
| 2,434,251 | Warnke | Jan. 13, 1948 |

FOREIGN PATENTS

| Number | Country | Date |
|---|---|---|
| 287,409 | Germany | Sept. 21, 1915 |